ANKNEY & McGREEVY.
Rotary Winnower.
No. 25,478.
Patented Sept. 20, 1859.
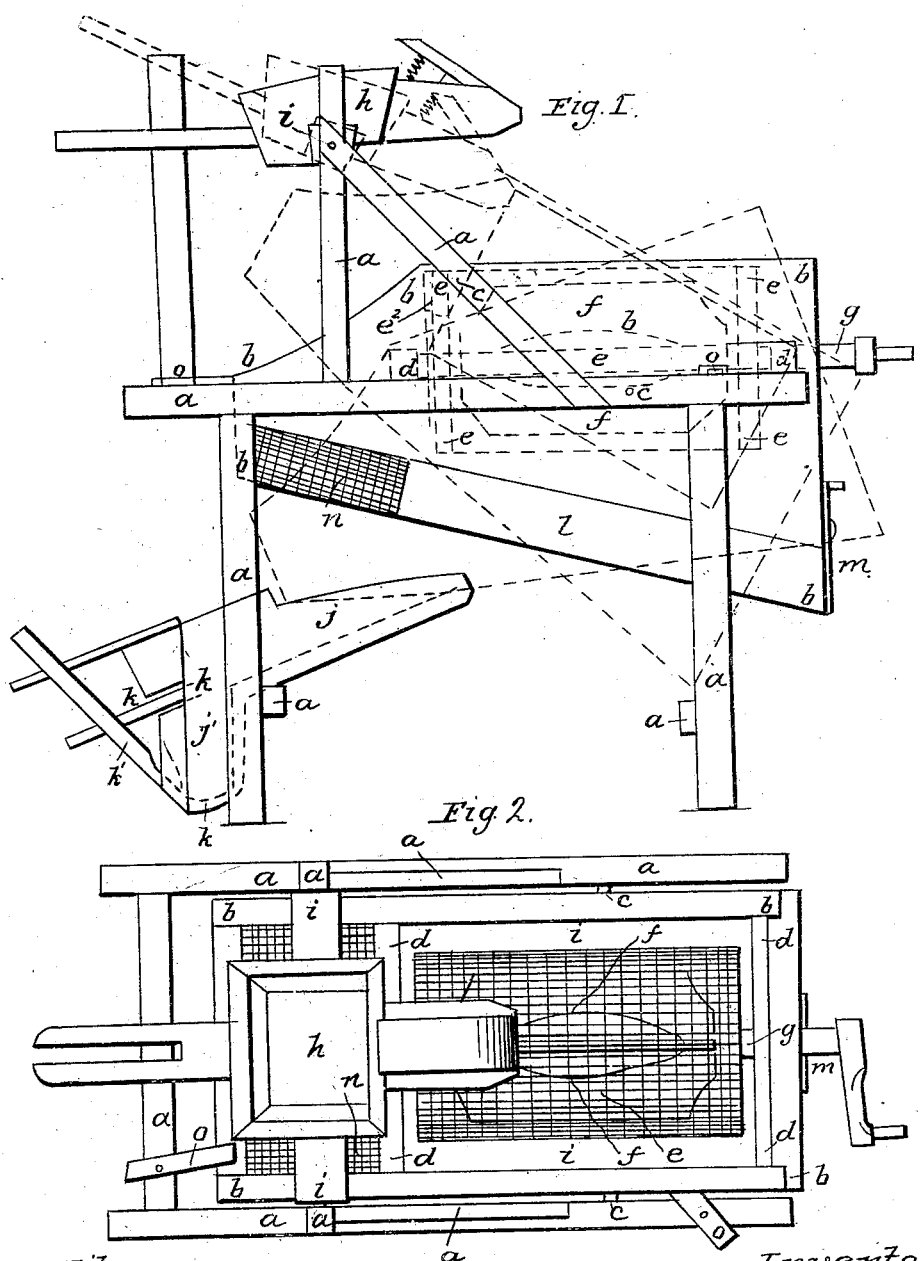

UNITED STATES PATENT OFFICE.

P. J. ANKNEY AND DANL. McGREEVY, OF NEW LEXINGTON, OHIO.

GRAIN-SEPARATOR.

Specification of Letters Patent No. 25,478, dated September 20, 1859.

*To all whom it may concern:*

Be it known that we, P. J. ANKNEY and DANIEL McGREEVY, of New Lexington, in the county of Perry and State of Ohio, have invented certain new and useful Improvements in Grain-Separators, which we verily believe have never before been known or used; and we do hereby declare that the following is a full and exact description thereof, reference being had to the accompanying drawings and to the letters of reference marked thereon.

In the drawings:—Figure (1) is a side elevation:—the red lines showing the forward end of the oscillating trough elevated so that the grain can be fed into the screen from the hopper:—the dotted red lines represent the trough depressed for the discharge of the wheat, or other grain. Fig. (2) is a plan view.

$a$ is the frame work.

$b$ is a trough or box oscillating on pivots $c$ between the frames.

$d$ are beams extending across trough $b$, and serve for bearings for cylindrical screen $e$.

$f$ are blades inside of screen $e$ attached to shaft $g$, and serve as agitators of the grain.

$e'$ is an opening in the forward end of screen, for the reception of the grain from the hopper. $e^2$ a gate for closing said opening. $h$ the hopper which is attached to a beam pivoted at $i$, and has an oscillating motion so as to be capable of being depressed to feed into the aperture of screen $e$.

$j$ is the spout for the discharge of the cleansed grain.

$j'$ is the lower portion of spout so constructed as to serve as a gage—$k$ being a cut off valve and $k'$ a discharge valve.

$l$ is the bottom of trough $b$;—this bottom runs downward to an apex, and inclines downward to the rear for the purpose of discharging the cockle, whiteheads, filth, &c., at the opening and gate $m$.

$n$ is a screen forming the bottom of the forward end of the trough.

$o\ o$ are buttons for holding trough in a horizontal position when the screen is separating the grain and dirt.

In operating our machine, the grain, which has been previously cleaned from the chaff, is put into hopper $h$; trough $b$ is then oscillated until the opening in screen is in a position indicated by the plain red lines in Fig. (1); the hopper is then tilted down until the mouth thereof is in conjunction with the aperture, the grain thus passes from the hopper into the screen. Motion is then given to the operating crank—the agitators $f$ causing the grain, &c., to be well shaken:—the screen thus separates the cockle dust, dirt, and fine filth from the grain. This dust, &c., falls through the meshes of the screen on the bottom $l$ and is discharged at opening $m$. The trough is now changed from the horizontal position given it after the filling of the screen, and is depressed as seen in dotted red lines. The gate $e^2$ is now opened and the grain whiteheads, and large dirt falls from the screen $e$ on to the large-mesh screen $n$, the grain passes into the spout $j$ while the whiteheads, &c., remain behind, and when the trough is again tilted, fall out at $m$. As the grain enters spout $j$ it fills gage $j'$, cut-off $k$, then checks the flow of grain from spout $j$, and discharge valve $k'$ permits it to pass out of gage $j'$. These valves are simultaneously operated.

Having thus described the construction and operation of our invention, what we claim as new and desire to secure by Letters Patent, is,

1. The oscillating hopper or trough $b$, as constructed, in combination with the revolving screen $e$, as constructed operating jointly, as described and for the purpose set forth.

2. We claim the combination of the screen $e$, and trough and hopper $b$, with the adjustable hopper or spout $h$ and the spout $j$, with gage $j'$, cut off $k$, and valve $k'$, the whole operating as described, and for the purpose set forth.

P. J. ANKNEY.
DANIEL McGREEVY.

Witnesses:
JACOB CASTIGAN,
J. M. BUELL.